(12) United States Patent
Saarikko et al.

(10) Patent No.: US 8,830,584 B2
(45) Date of Patent: Sep. 9, 2014

(54) EXIT PUPIL EXPANDERS WITH SPHERICAL AND ASPHERIC SUBSTRATES

(75) Inventors: Pasi Saarikko, Espoo (FI); Tapani Levola, Tampere (FI)

(73) Assignee: Nokia Corporation, Espoo (FI)

( * ) Notice: Subject to any disclaimer, the term of this patent is extended or adjusted under 35 U.S.C. 154(b) by 528 days.

(21) Appl. No.: 12/746,226

(22) PCT Filed: Dec. 17, 2007

(86) PCT No.: PCT/IB2007/003965
§ 371 (c)(1),
(2), (4) Date: Aug. 24, 2010

(87) PCT Pub. No.: WO2009/077803
PCT Pub. Date: Jun. 25, 2009

(65) Prior Publication Data
US 2010/0315719 A1    Dec. 16, 2010

(51) Int. Cl.
*G02B 5/18* (2006.01)
*G02B 27/12* (2006.01)
*G02B 27/00* (2006.01)
*G02B 27/01* (2006.01)

(52) U.S. Cl.
CPC .... *G02B 27/0081* (2013.01); *G02B 2027/0127* (2013.01); *G02B 2027/0123* (2013.01); *G02B 5/18* (2013.01); *G02B 2027/011* (2013.01); *G02B 27/0101* (2013.01)
USPC ........................................... 359/567; 359/630

(58) Field of Classification Search
USPC ............. 359/13, 566, 630, 634, 14, 558, 567, 359/569, 575, 618, 629, 631, 632, 633; 385/37; 345/7–9
See application file for complete search history.

(56) References Cited

U.S. PATENT DOCUMENTS

| | | | |
|---|---|---|---|
| 4,874,214 A | * | 10/1989 | Cheysson et al. ............... 359/15 |
| 4,886,341 A | * | 12/1989 | Oishi et al. ..................... 359/575 |
| 2001/0001583 A1 | * | 5/2001 | Kato ............................. 359/566 |
| 2004/0062503 A1 | | 4/2004 | Challener ..................... 385/129 |

FOREIGN PATENT DOCUMENTS

| | | |
|---|---|---|
| EP | 1 542 062 A1 | 6/2005 |
| EP | 1 804 103 A1 | 7/2007 |
| WO | WO-99/52002 | 10/1999 |
| WO | WO 2006/064301 A1 | 6/2006 |
| WO | WO 2006/098097 A1 | 9/2006 |
| WO | WO-2007/141587 A1 | 12/2007 |
| WO | WO-2007/141589 A1 | 12/2007 |
| WO | WO-2009/077803 A1 | 6/2009 |

OTHER PUBLICATIONS

Wikipedia (Spherical coordinate system, available at: http://en.wikipedia.org/wiki/Spherical_coordinate_system).*
Wikipedia (Geographic coordinate system, available at: http://en.wikipedia.org/wiki/Geographic_coordinate_system).*

(Continued)

*Primary Examiner* — Jennifer L Doak
*Assistant Examiner* — Kimberly N Kakalec
(74) *Attorney, Agent, or Firm* — Harrington & Smith

(57) ABSTRACT

The specification and drawings present a new apparatus and method for using exit pupil expanders (EPE) with spherical or aspheric non-flat substrates and a plurality of diffractive elements for expanding the exit pupil of a display for viewing in order to reduce image spreading. This can also enable improved image resolution and utilization of shorter focus distances.

21 Claims, 8 Drawing Sheets

(56) References Cited

OTHER PUBLICATIONS

Sheriv et al., "Compact Holographic Beam Expander", Optics Letters vol. 18, No. 15, (1993), (pp. 1268-1270).
Frank Sauer, "Fabrication of Diffractive-reflective Optical Interconnects for Infra Red Operation Based on Total Internal Reflection" Applied Optics, vol. 28, No. 2., (1989), (pp. 386-388).
Shechter et al., "Compact red-green-blue beam illuminator and expander", Applied Optics, vol. 41, No. 7, (2002), (pp. 1230-1235).
Shechter et al., "Compact beam expander with linear grating", Applied Optics, vol. 41, No. 7. (2002), (pp. 1237-1240).
Amitai et al., "Visor display design based on planar holographic optics", Applied Optics, vol. 34, No. 8., (1995), (pp. 1353-1356).
Levola, T., "Diffractive Optics for Virtual Reality Displays", © 2006, Journal of the Society for Information Display, abstract only attached.
Levola, T., "7.1: Invited Paper, Novel Diffractive Optical Components for Near to Eye Displays," *SID Symposium Digest of Technical Papers*, Jun. 2006, vol. 37, Issue 1, pp. 64-67 (Abstract only).
Levola, T., "28.2 Stereoscopic Near to Eye Display using a Single Microdisplay," *SID Symposium Digest of Technical Papers*, May 2007, vol. 38, Issue 1, pp. 1158-1159 (Abstract only).
Levola, T., "Diffractive Optics for Virtual Reality Displays," *Nokia Research Center*, Cisiokatu 1, 33720, Tampere, Finland (26 pages).

\* cited by examiner

EXIT PUPIL EXPANDERS WITH SPHERICAL AND ASPHERIC SUBSTRATES

TECHNICAL FIELD

The present invention relates generally to display devices and, more specifically, to exit pupil expanders with spherical or aspheric non-flat substrates and a plurality of diffractive elements for expanding the exit pupil of a display for viewing.

BACKGROUND ART

Near-to-Eye Displays (NEDs) utilizing diffractive Exit Pupil Expanders (EPEs) made on flat substrates are suitable for generation images of virtual displays at infinite viewing distance. If used for near-distance objects, each object point is replicated in the EPE plate, which is seen as pixel blurring in the virtual display. For example, if the imaging optics of the NED is designed to provide an input image at a finite viewing distance, each display pixel will consist of a range of ray angles. When coupled into a planar EPE the whole range of incident ray angles will emerge from all the ray-interception points along the out-coupling grating. Thus, a single display pixel will appear to be replicated or blurred when observed through the EPE. The limitation of infinite viewing distance may be a problem for near-sighted people. In particular, in mobile applications compact eye-glass type NEDs are preferred that are not well suited for wearing with regular eye glasses. Furthermore, the limitation of infinite image distance can lead to significant reduction in the viewing experience and limit the range of potential applications, such as stereoscopic 3D (3-dimensional) viewing.

The situation can be improved with the use of a cylindrically shaped EPE as described in the PCT patent application, International Publication Number WO2006064301. In such arrangement horizontal rays (in a direction perpendicular to an axis of a cylinder surface of the EPE substrate) emanated from the center of the object plane can be imaged perfectly, i.e., the object point replication along the horizontal direction as observed with the flat EPE plate is cancelled. However, rays with a vertical propagation component (in a direction parallel to the axis of the cylindrical surface) are shifted in a vertical direction and, thus, the object points will appear as lines when observed through the cylindrical EPE with substantial spreading. In general, the amount of vertical spreading of the object points depends on the focus distance (EPE curvature), vertical expansion, and pupil size of the observer.

DISCLOSURE OF THE INVENTION

According to a first aspect of the invention, an apparatus comprises: a non-flat substrate of optical material having a first surface and a second surface which is opposite to the first surface, wherein the first and second surfaces have a spherical or aspheric shape; an in-coupling diffractive element disposed on the first or the second surface of the non-flat substrate for receiving an input optical beam; and one or more out-coupling diffractive elements disposed on the first or the second surface of the non-flat substrate, wherein the in-coupling diffractive element is configured to diffract the input optical beam, so as to provide one or more diffracted optical beams substantially within the first and second surfaces such that a portion of each of the one or more diffracted optical beam is coupled to a corresponding out-coupling diffractive element of the one or more out-coupling diffractive elements, and wherein each of the one or more out-coupling diffractive elements is configured to couple by diffraction parts of the one or more diffracted optical beams from the non-flat substrate for providing one or more output optical beams out of the non-flat substrate.

According further to the first aspect of the invention, the one or more output optical beams may have an expanded exit pupil in one or two dimensions relative to the input optical beam.

Further according to the first aspect of the invention, the input optical beam may be emanated from a virtual image of a display or a microdisplay.

Still further according to the first aspect of the invention, distances between diffraction grating lines of the in-coupling diffractive element and of the one or more out-coupling diffractive elements may be varied according to a predetermined criterion.

According further to the first aspect of the invention, a thickness of the substrate may be substantially uniform.

Still yet further according to the first aspect of the invention, the input optical beam may be generated by an object or a virtual object located in a focal plane of a spherical or an aspheric inner surface comprising the first or the second surface whichever is closer to the focal plane. Further still, a distance between the spherical inner surface and the focal plane may be equal to a radius of the spherical inner surface. Yet further still, a central point of the object may be imaged substantially without aberrations by the apparatus.

According still further to the first aspect of the invention, an object or a virtual object generating the input optical beam may be located at a finite distance from the non-flat substrate.

According further still to the first aspect of the invention, for the spherical shape, grooves of the in-coupling diffractive element and of the one or more out-coupling diffractive elements may be along parallels of a spherical coordinate system. Still further, a spacing, projected on a reference plane between adjacent grooves, of the in-coupling diffractive element or of the one or more out-coupling diffraction elements may be inversely proportional to sine of an angle between a line crossing a middle point of one of the adjacent grooves of the in-coupling diffractive element or of the one or more out-coupling diffraction elements and an origin of the spherical coordinate system and a line crossing the middle point and a pole of the spherical coordinate system, wherein the reference plane is a focal plane of a spherical or an aspheric inner surface comprising the first or the second surface of the non-flat substrate, whichever is closer to the focal plane. Yet still further, the in-coupling diffractive element may be positioned such that the angle equals ninety degrees for a groove located in the middle point of the in-coupling diffractive element.

According yet further still to the first aspect of the invention, the apparatus may further comprise one or more intermediate diffractive elements disposed on the non-flat substrate such that at least one or more parts of the input optical beam diffracted in the in-coupling diffractive element may be first coupled to the one or more intermediate diffractive elements, which may be configured to further couple by diffraction corresponding optical beams to the one or more out-coupling diffractive elements, for providing the one or more output optical beams with an expanded exit pupil in two dimensions relative to the input optical beam.

According to a second aspect of the invention, a method comprises: receiving an input optical beam by an in-coupling diffractive element disposed on a first or a second surface of a non-flat substrate, wherein the first and second surfaces have a spherical or aspheric shape and are opposite to each other; diffracting the input optical beam to provide one or more diffracted optical beams substantially within the first and second surfaces such that a portion of each of the one or more diffracted optical beam is coupled to a corresponding out-coupling diffractive element of one or more out-coupling diffractive elements disposed on the first or the second surface of the non-flat substrate; and coupling by diffraction parts of the one or more diffracted optical beams from the non-flat substrate using the one or more out-coupling diffractive elements for providing one or more output optical beams out of the non-flat substrate.

According further to the second aspect of the invention, the one or more output optical beams may have an expanded exit pupil in one or two dimensions relative to the input optical beam.

Further according to the second aspect of the invention, the input optical beam may be emanated from a virtual image of a display or a microdisplay.

Still further according to the second aspect of the invention, distances between diffraction grating lines of the in-coupling diffractive element and of the one or more out-coupling diffractive elements may be varied according to a predetermined criterion.

According further to the second aspect of the invention, a thickness of the substrate may be substantially uniform.

According still further to the second aspect of the invention, the input optical beam may be generated by an object or a virtual object located in a focal plane of a spherical or an aspheric inner surface comprising the first or the second surface whichever is closer to the focal plane.

According further still to the second aspect of the invention, a distance between the spherical inner surface and the focal plane may be equal to a radius of the spherical inner surface.

According yet further still to the second aspect of the invention, an object or a virtual object generating the input optical beam may be located at a finite distance from the non-flat substrate.

Yet still further according to the second aspect of the invention, for the spherical shape, grooves of the in-coupling diffractive element and of the one or more out-coupling diffractive elements may be along parallels of a spherical coordinate system. Still further, a spacing projected on a reference plane between adjacent grooves of the in-coupling diffractive element or of the one or more out-coupling diffraction elements may be inversely proportional to sine of an angle between a line crossing a middle point of one of the adjacent grooves of the in-coupling diffractive element or of the one or more out-coupling diffraction elements and an origin of the spherical coordinate system and a line crossing the middle point and a pole of the spherical coordinate system, wherein the reference plane is a focal plane of a spherical or an aspheric inner surface comprising the first or the second surface of the non-flat substrate, whichever is closer to the focal plane.

According to a third aspect of the invention, an electronic device, comprises:
   a data processing unit;
   an optical engine operatively connected to the data processing unit for receiving image data from the data processing unit;
   a display device operatively connected to the optical engine for forming an image based on the image data; and
   an exit pupil expander comprising: a non-flat substrate of optical material having a first surface and a second surface which is opposite to the first surface, wherein the first and second surfaces have a spherical or aspheric shape; an in-coupling diffractive element disposed on the first or the second surface of the non-flat substrate for receiving an input optical beam; and one or more out-coupling diffractive elements disposed on the first or the second surface of the non-flat substrate, wherein the in-coupling diffractive element is configured to diffract the input optical beam, so as to provide one or more diffracted optical beams substantially within the first and second surfaces such that a portion of each of the one or more diffracted optical beam is coupled to a corresponding out-coupling diffractive element of the one or more out-coupling diffractive elements, and wherein each of the one or more out-coupling diffractive elements is configured to couple by diffraction parts of the one or more diffracted optical beams from the non-flat substrate for providing one or more output optical beams out of the non-flat substrate.

According further to the third aspect of the invention, the one or more output optical beams may have an expanded exit pupil in one or two dimensions relative to the input optical beam.

BRIEF DESCRIPTION OF THE DRAWINGS

For a better understanding of the nature and objects of the present invention, reference is made to the following detailed description taken in conjunction with the following drawings, in which.

MODES FOR CARRYING OUT THE INVENTION

Figure 1:
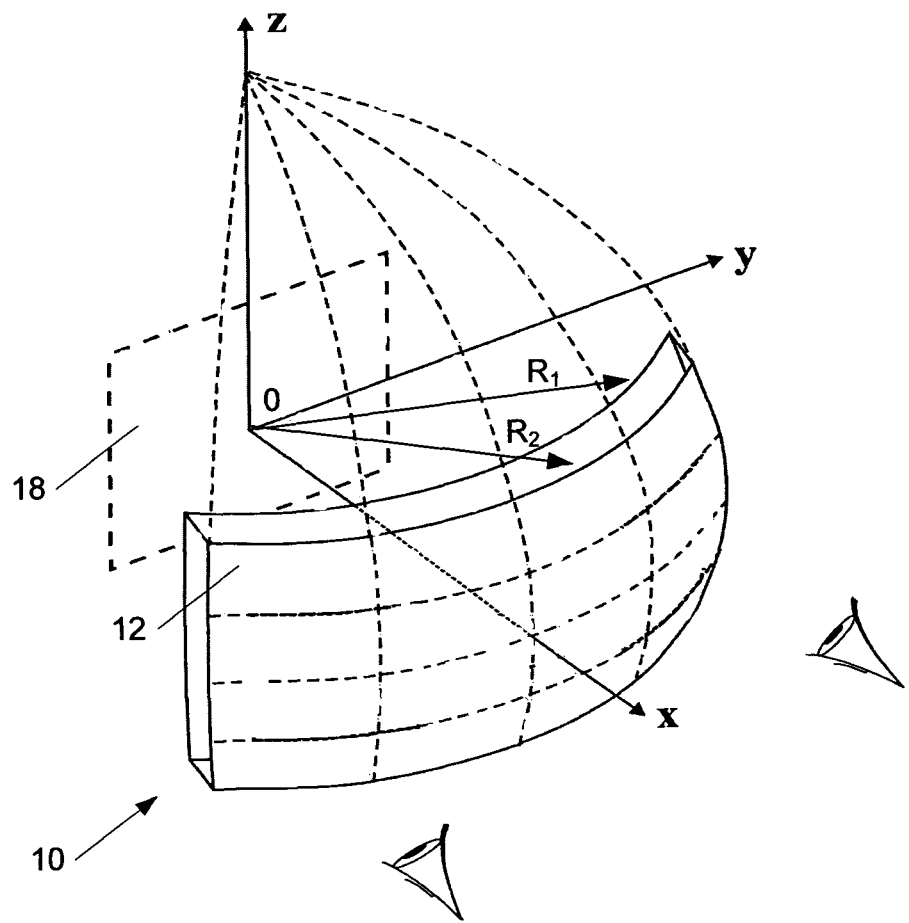
FIG. 1 is a schematic representation demonstrating a geometry of a near focus exit pupil expander with a non-flat (e.g., spherical shape) substrate, according to an embodiment of the present invention.

A new method and apparatus are presented for using exit pupil expanders (EPE) with spherical or aspheric non-flat substrates and a plurality of diffractive elements for expanding the exit pupil of a display for viewing in order to reduce image spreading. This can also enable improved image resolution and utilization of shorter focus distances.

The embodiments of the present invention can be applied to a broad optical spectral range of optical beams but most importantly to a visible part of the optical spectrum where the optical beams are called light beams. It is further noted that for describing various embodiments of the present invention the term "non-flat substrate" can be interpreted as a thin non-flat waveguide with two surfaces (e.g., first and second surfaces) and typically having substantially uniform thickness. Also the term "aspheric" can be broadly defined as a surface with a profile that is neither a portion of a sphere nor of a circular cylinder and it is not flat and can be described by complex equations, wherein simple examples can include but are not limited to parabola, hyperbola, ellipse, etc.

According to an embodiment of the present invention, an optical device (e.g., the optical device can be a part of a virtual reality display) such as an exit pupil expander can comprise a non-flat substrate of optical material having a first surface and a second surface which is opposite to the first surface, wherein the first and second surfaces can have a spherical or aspheric shape.

Moreover, the input optical beam emanated from an object or a virtual object (e.g., a virtual image of a display or a microdisplay) can be received by an in-coupling diffractive element with a suitably selected grating line geometry disposed on the first or the second surface of the non-flat substrate. Then the input optical beam can be diffracted by the in-coupling diffractive element (e.g., diffraction grating) to provide one or more diffracted optical beams substantially within the first and second surfaces such that a portion of each of the one or more diffracted optical beam is coupled (e.g., using total internal reflection in the non-flat substrate and optionally using an intermediate diffraction grating for two-dimensional expansion) to a corresponding out-coupling diffractive element of the one or more out-coupling diffractive elements with an appropriately selected grating line geometry which are disposed on the first or the second surface of the non-flat substrate. Then parts of the one or more diffracted optical beams can be coupled by diffraction from the non-flat substrate using the one or more out-coupling diffractive elements for providing one or more output optical beams out of said non-flat substrate (e.g., one out-coupling diffractive element for a monocular viewing, two out-coupling diffractive element for a binocular viewing, etc.). The one or more output optical beams can have expanded exit pupil in one or two dimensions relative to the input optical beam and high resolution because of reduced aberrations and beam spreading.

According to an embodiment of the present invention, an object or a virtual object (e.g., a virtual image of the microdisplay) generating the input optical beam can be located in a focal plane of a spherical or an aspheric inner surface comprising the first or the second surface (whichever is closer to the focal plane) and a central point of the object is imaged by the EPE device substantially without aberrations. Generally the object generating the input optical beam can be located at a finite distance from the non-flat substrate. For the spherical substrates, a distance between the spherical inner surface of the non-flat substrate and the focal plane can be equal to a radius of the spherical inner surface.

It is further noted that the virtual display with non-flat substrates, described herein, can be used and/or designed for monocular or binocular viewing, therefore the scenario described herein can be used for both monocular and binocular viewing.

Moreover, if two out-coupling diffractive elements are used, typically these two out-coupling diffractive elements can be symmetrical relative to the in-coupling diffractive element. Also, the out-coupling diffractive elements and the in-coupling diffractive elements in each substrate can have parallel periodic lines.

According to further embodiments, the two-dimensional expansion can be provided by using one or more intermediate diffractive elements disposed on the non-flat substrate and positioned appropriately relative to the in-coupling diffractive element and the one or more out-coupling diffractive elements such that at least parts of the input optical beam diffracted in the in-coupling diffractive element are first coupled to the corresponding one or more intermediate diffractive elements, which can be configured to couple further by diffraction corresponding optical beams to the one or more out-coupling diffractive elements, respectively, for providing the one or more output optical beams with the expanded exit pupil in two dimensions. As in a flat-substrate case, the intermediate diffractive element can have an odd number of first order diffractions or an even number of further first order reflections as known in the art and, e.g., described by T. Levola in "Diffractive Optics for Virtual Reality Displays", SID Eurodisplay 05, Edinburgh (2005), SID 02 Digest, Paper 22.1.

According to embodiments of the present invention, the in-coupling and one or more out-coupling diffractive elements (diffraction gratings) can be formed by imprinting series of grooves on the inner (and/or outer) surface of the non-flat substrate (waveguide) within the in-coupling and out-coupling areas. The grooves can be manufactured in a number of ways using standard lithographic, etching, and replication methods. The in-coupling diffractive elements (i.e., their grooves) can be symmetric or asymmetric, e.g., using slanted gratings for increasing the coupling efficiency and reducing an "optical crosstalk" between left and right half spaces relative to the in-coupling diffraction element (e.g., shown in FIG. 3). For example, the slanted gratings can be asymmetric such that their slanting angles are equal but have opposite signs relative to the optical axis of the input optical beam, i.e., the groove shapes are mirror images of each other.

According to a further embodiment, diffraction grating lines (e.g., distance between the lines or density of the grating grooves) of the in-coupling diffractive element and of the one or more out-coupling diffractive elements can be varied according to a predetermined criterion. For example for the spherical non-flat substrate, grooves of the in-coupling diffractive element and of the one or more out-coupling diffractive elements can be along parallels of a spherical coordinate system. Furthermore, a spacing between adjacent grooves of the in-coupling diffractive element or of the one or more out-coupling diffraction elements can be inversely proportional to sine of an angle between a line crossing a middle point of one of the adjacent grooves of the in-coupling diffractive element or of the one or more out-coupling diffraction elements and an origin of the spherical coordinate system and a line crossing this middle point and a pole of the spherical coordinate system, wherein the in-coupling diffractive element is positioned such that this angle equals 90° degrees for a groove located in the middle point of the in-coupling diffractive element (thus corresponding to a minimum groove spacing (see discussions in reference to FIG. 3).

FIG. 1 shows one example among others of a schematic representation demonstrating a geometry of a near focus exit pupil expander (EPE) 10 with a non-flat (e.g., spherical shape) substrate 12, according to an embodiment of the present invention. The EPE shape is modified to be a section of a spherical shell with an inner radius $R_1$ equal, e.g., to the desired focus distance, i.e., viewing distance of the virtual display. The object plane 18 is at the focal plane of the spherical EPE section and the observer is looking at the virtual image through the EPE towards the focal plane. The input image can be a virtual image of a microdisplay (not shown in FIG. 1) that is placed next to the input section of the EPE 10 and the virtual image of this microdisplay is located at the focal plane 18 of the spherical EPE section.

Figure 2:
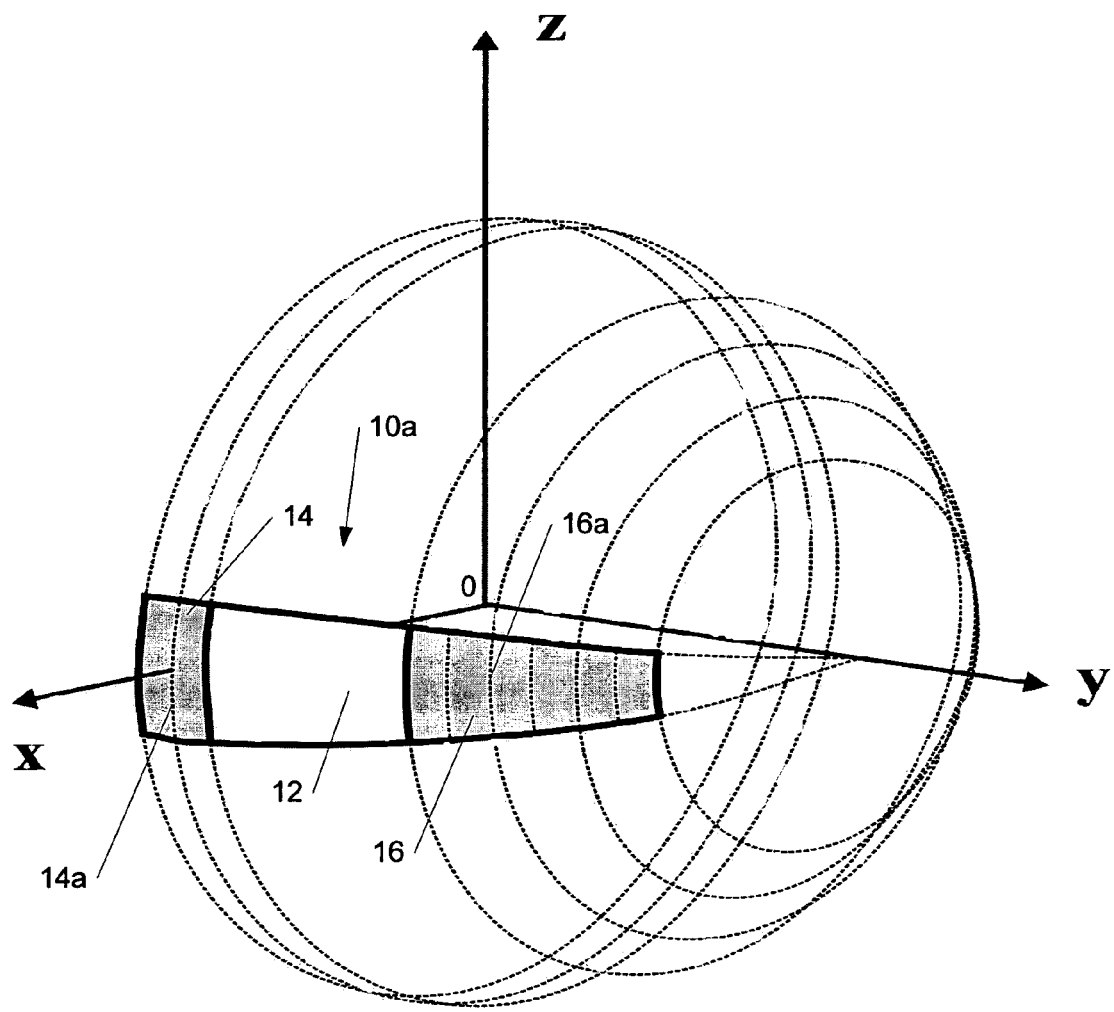
FIG. 2 is a schematic representation demonstrating a geometry of diffraction gratings of an exit pupil expander with a non-flat (e.g., spherical shape) substrate for monocular viewing, according to an embodiment of the present invention.

FIG. 2 shows one example among others of a schematic representation demonstrating a geometry of diffraction gratings of an exit pupil expander 10a with a non-flat (e.g., spherical shape) substrate, for the monocular viewing, according to an embodiment of the present invention. An in-coupling diffractive element (e.g., diffraction grating) 14 and an out-coupling diffractive element (e.g., diffraction grating) 16 are disposed on one of the surfaces of the non-flat (e.g., spherical) substrate 12. The grating grooves 14a and 16a of the in-coupling and out-coupling gratings 14 and 16 are taken to be along the parallels of the spherical coordinate system or, in geographical terms, the circles of latitude. With this choice of grating lines it can be shown that the central point on the object plane can be imaged perfectly through the EPE 10a (see discussions in regard to FIG. 4a). An image point of a given input pixel of the object plane (the object plane 18 was described in reference to FIG. 1) can be determined from the chief rays, i.e., input rays emanating from the input pixel towards the center of the input pupil (in-coupling area).

The input optical beam emanating from all pixels of the object plane is coupled to an in-coupling diffraction element 14 and diffracted by the in-coupling grating 14 within first and second surfaces of the non-flat substrate 12. The geometry of the in-coupling grating 14 can be chosen by considering the combined criteria for the existence of chosen diffraction orders (e.g., +1 and/or −1) and for existence of the total internal reflection (TIR) inside of the non-flat diffraction grating 14 for incidence angles within a desired field of view (FOV).

The in-coupling light propagation can be performed in a local coordinate frame of the in-coupling grating 14 which may require a coordinate transformation to/from a local coordinate frame from/to the reference Cartesian XYZ coordinate system shown in FIG. 2.

The diffracted coupled optical beam can propagate by a way of a total internal reflection (TIR) through the non-flat substrate (waveguide) 12 to an out-coupling grating 16. In case of a thin element approximation (i.e., the difference between the curvature radiuses R1 and R2, shown in FIG. 1, is much smaller than R1), this TIR propagation is very close the propagation in the flat substrate (waveguide). But in general for a spherical non-flat substrate, a direction vector of the propagated rays can be obtained by rotation of the in-coupled direction vector about the surface normal of the propagation plane through a given angle, thus providing the direction vector, e.g., on the out-coupling grating 16. For more complicated profiles of the non-flat substrate the ray propagation may not be limited to a simple plane.

Finally the out-coupling diffraction element 16 can be configured to couple out by diffraction the received optical beam from the non-flat substrate 12 for providing an output optical beam with the expanded pupil. As in flat EPE plates the out-coupling grating 16 can be selected to match the in-coupling grating 14 as much as possible (see an example in reference to FIG. 3). The out-coupling light propagation can be performed in a local coordinate frame of the out-coupling grating 16 which also may require the coordinate transformation to/from a local coordinate frame from/to the reference Cartesian XYZ coordinate system shown in FIG. 2.

Figure 3:
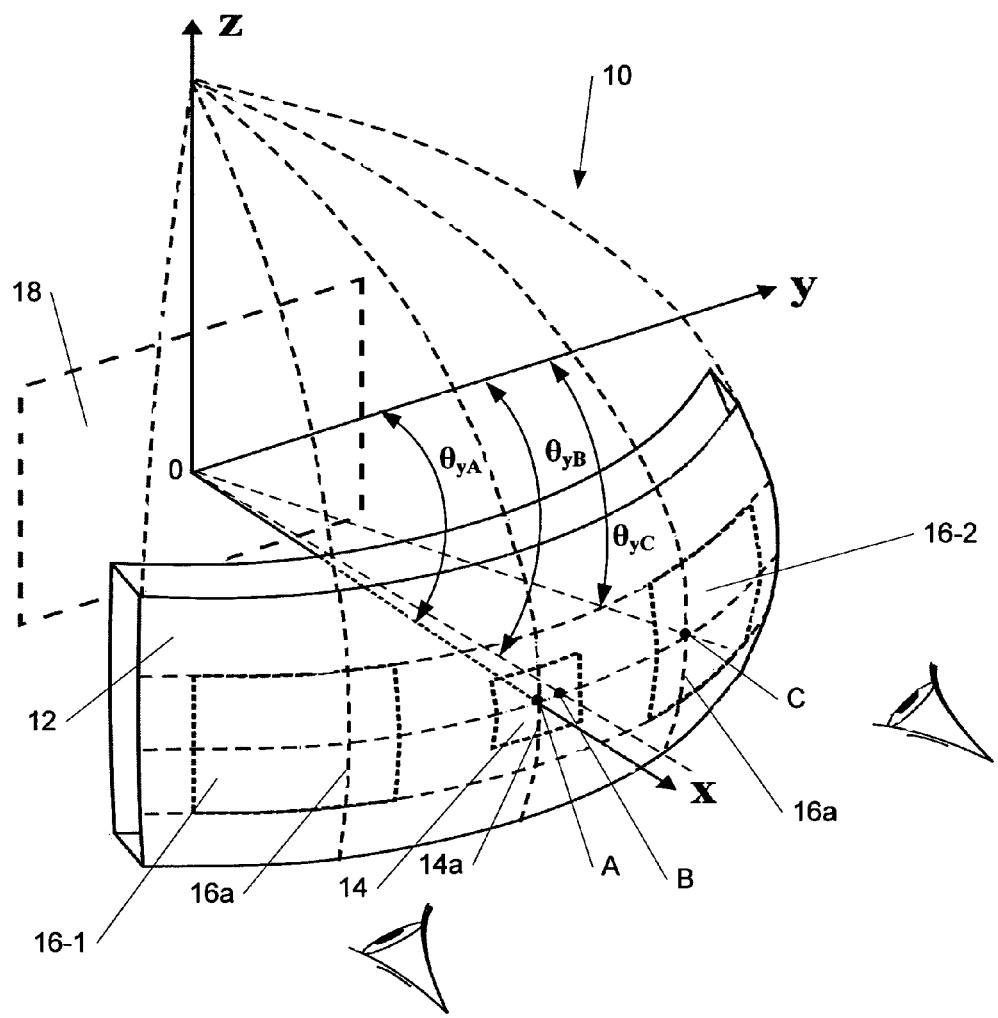
FIG. 3 is a schematic representation demonstrating a geometry of diffraction gratings of an exit pupil expander with a non-flat (e.g., spherical shape) substrate for binocular viewing, according to an embodiment of the present invention.

It is noted that in general the input optical beam can be emanated from an object space (e.g., the dimensions of the object space should be much smaller than the distance from diffraction gratings to the object space) which is three-dimensional, i.e., from single or multiple voxels (or three-dimensional pixels), and/or that the output optical beam/beams can virtually converge to corresponding single or multiple voxels in the image space in a relationship with the input optical beam. FIG. 3 shows another example among others of a schematic representation demonstrating a geometry of diffraction gratings of an exit pupil expander 10 with a non-flat (spherical shape) substrate 12 for the binocular viewing, according to an embodiment of the present invention. The location of the object plane 18 relative to the non-flat EPE 10 is the same as shown in FIG. 1. The difference with FIG. 2 is that there are two out-coupling diffractive elements (gratings) 16-1 and 16-2, respectively, to provide two output optical beams for binocular viewing. The in-coupling diffraction grating 14 can provide two diffracted optical beams coupled (e.g., by the Tilt) to the out-coupling diffraction gratings 16-1 and 16-2. The in-coupling diffraction grating 14 can be implemented, e.g., as asymmetric slanted gratings for increasing the coupling efficiency and reducing an "optical crosstalk" between left and right out-coupling gratings 16-1 and 16-2. FIG. 3 may further illustrate the choice of parameters for diffraction gratings 14, 16-1 and 16-2, according to an embodiment of the present invention.

The grooves 14a and 16a of the in-coupling diffractive element 14 and of the two out-coupling diffractive elements 16-1 and 16-2, respectively, can be along parallels of a spherical coordinate system XYZ to follow interception lines parallel to the XZ-plane (as in FIG. 2), i.e., the groove lines may form little circles with their axes coincident with Y-axis. For example, the groove intersecting the middle point (or vertex) of the in-coupling diffractive element 14 lies in the XZ-plane.

Furthermore, it can be shown that a spacing projected on the yz-plane (or equivalently projected on the focal plane of the spherical or the aspheric inner surface comprising the first or the second surface, whichever is closer to the focal plane, of the non-flat substrate) between adjacent grooves of the in-coupling diffractive element 14 or of the out-coupling diffraction elements 16-1 and 16-2 can be inversely proportional to sine of a pole angle (e.g., angles $\theta_{yA}$, $\theta_{yB}$ or $\theta_{yC}$) between a line crossing a middle point of one of the adjacent grooves of any of these gratings and an origin (point 0) of the Cartesian coordinate system XYZ and a line crossing the origin and a pole of said spherical coordinate system (i.e., axis Y, in a positive or negative direction). Thus for a groove located in the middle point of the in-coupling diffractive element 14, this angle $\theta_{yA}$ is 90°. Then for the point B of the in-coupling diffractive element 14, the angle $\theta_{yB}$ is less than $\theta_{yA}$, therefore the spacing between grooves (diffraction lines), projected on the yz-plane, is reduced gradually from the center to the right edge (inversely proportional to the sine of the pole angle). The location of grooves on the left from the point A in the in-coupling diffraction grating 14 are symmetrical to the grooves on the right side of the in-coupling diffraction grating 14. The same is applied to the out-coupling gratings 16-1 and 16-2. For example, for the point C of the out-coupling diffractive element 16-2, the angle $\theta_{yC}$ is less than $\theta_{yA}$ or $\theta_{yA}$, therefore the spacing between grooves (diffraction lines), projected on the yz-plane, of the grating 16-2 are gradually reduced for the lines located further away from the point A (inversely proportional to the sine of the pole angle), as described herein.

Figure 4A:
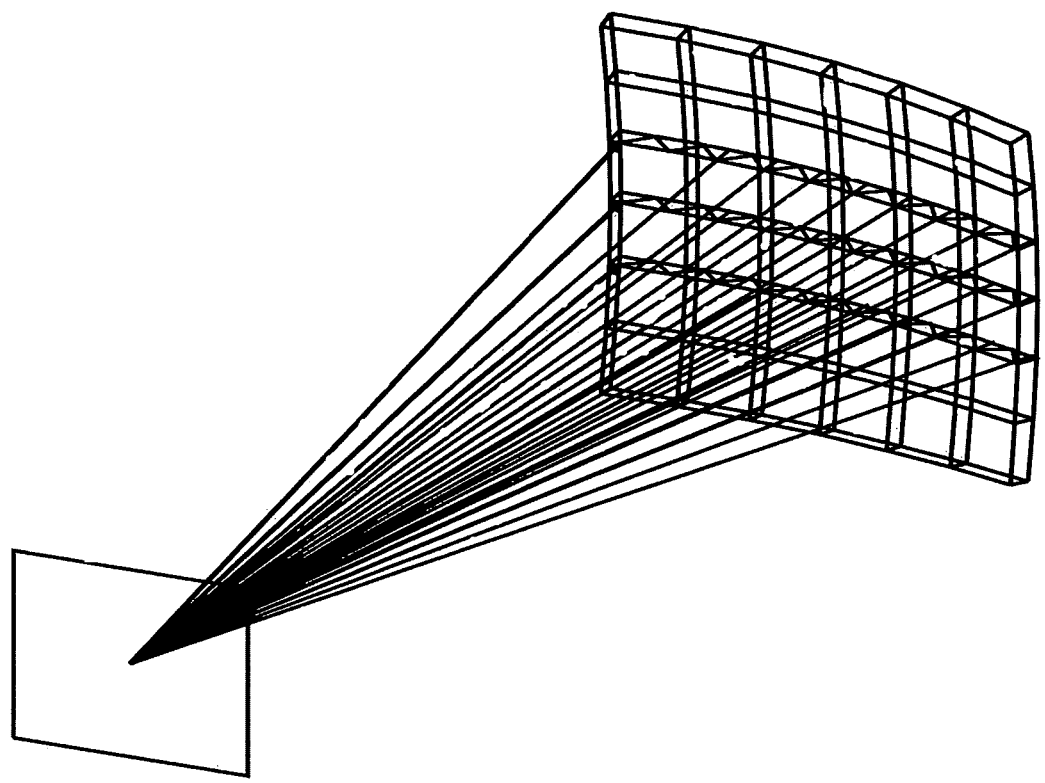
FIGS. 4a and 4b are schematic representations demonstrating imaging of a center object point (FIG. 4a) and of an off-center object point (FIG. 4b) by the EPE with a non-flat spherical substrate, according to an embodiment of the present invention.
Figure 4B:
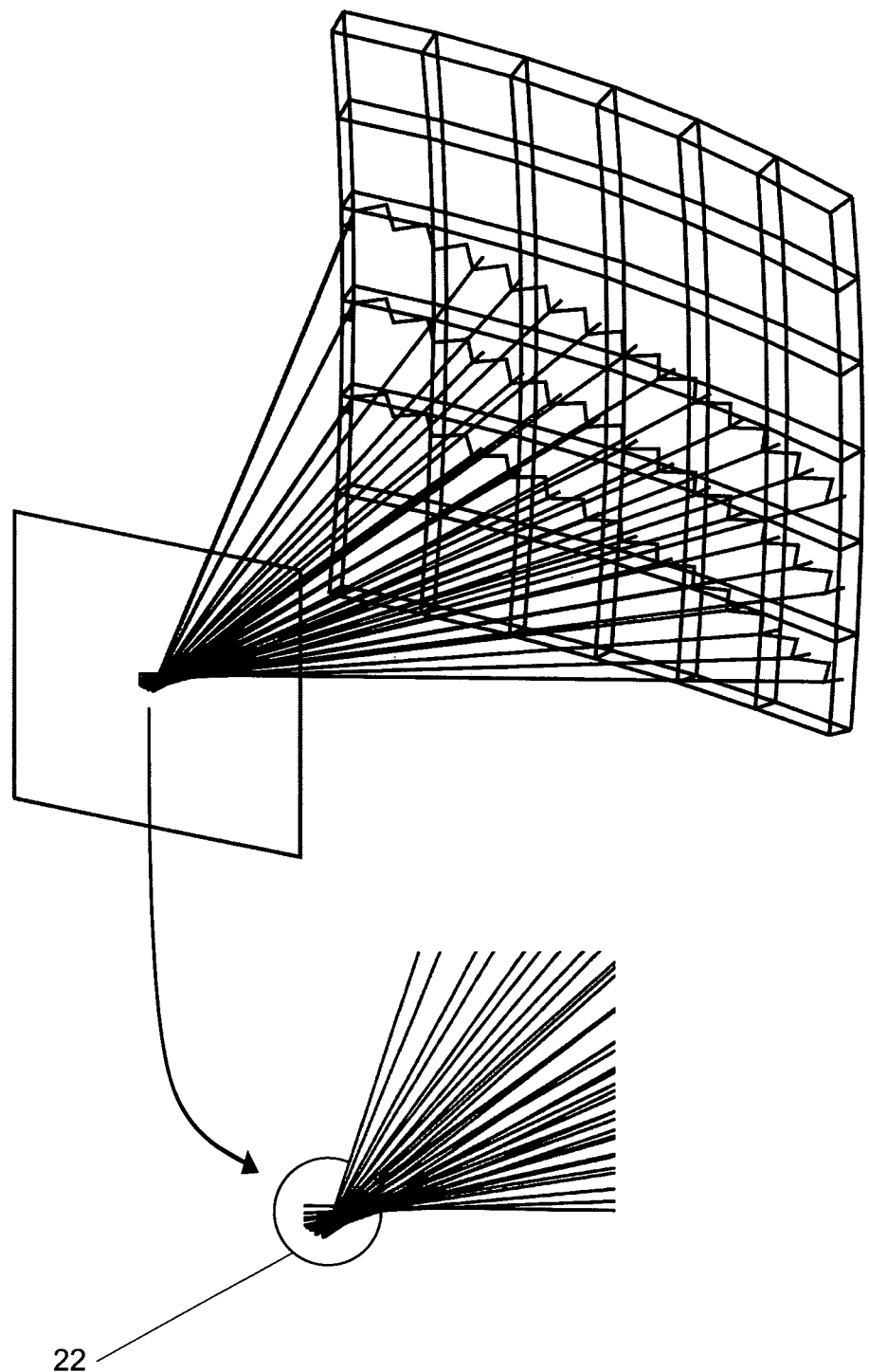

FIGS. 4a and 4b show schematic representations demonstrating simulation of ray paths through a spherical non-flat EPE for imaging of a center object point (FIG. 4a) and an off-center object point (FIG. 4b), according to an embodiment of the present invention. The focal distance for the simulation is chosen to be 50 mm. The off-center object point coordinates are 14.1 mm and 14.1 mm (y,z). The simulations were performed using standard ray tracing methods. The effect of diffractive gratings was taken into account with aid of diffraction equations for the direction ray cosines. Diffraction efficiencies were assumed to be constant for all incidence angles. The parameters used in the simulations are as follows: index of refraction for the substrate is 1.73, radius of the inner surface of the substrate is 50 mm, radius of the outer surface of the substrate is 51 mm, grating period in the middle point of the in-coupling diffractive element (grating) is 365 nm, and wavelength is 550 nm.

The simulation shown in FIG. 4a demonstrates perfect focusing in both horizontal and vertical planes, as compared with cylindrical EPE, wherein the amount of vertical spreading of the object points may depend on the focus distance (EPE curvature), vertical expansion, and pupil size of the observer. The same reduction of the vertical spreading for non-flat spherical EPE can apply to off center object points, as shown in FIG. 4b, but including residual aberrations (non-perfect imaging) 22. It is noted that the focus distance in the simulations shown in FIGS. 4a and 4b was selected to be very short for better visualization. In practice, the focus distance can be an order of magnitude larger, which will lead closer to paraxial imaging conditions and better resolution properties.

Figure 5:
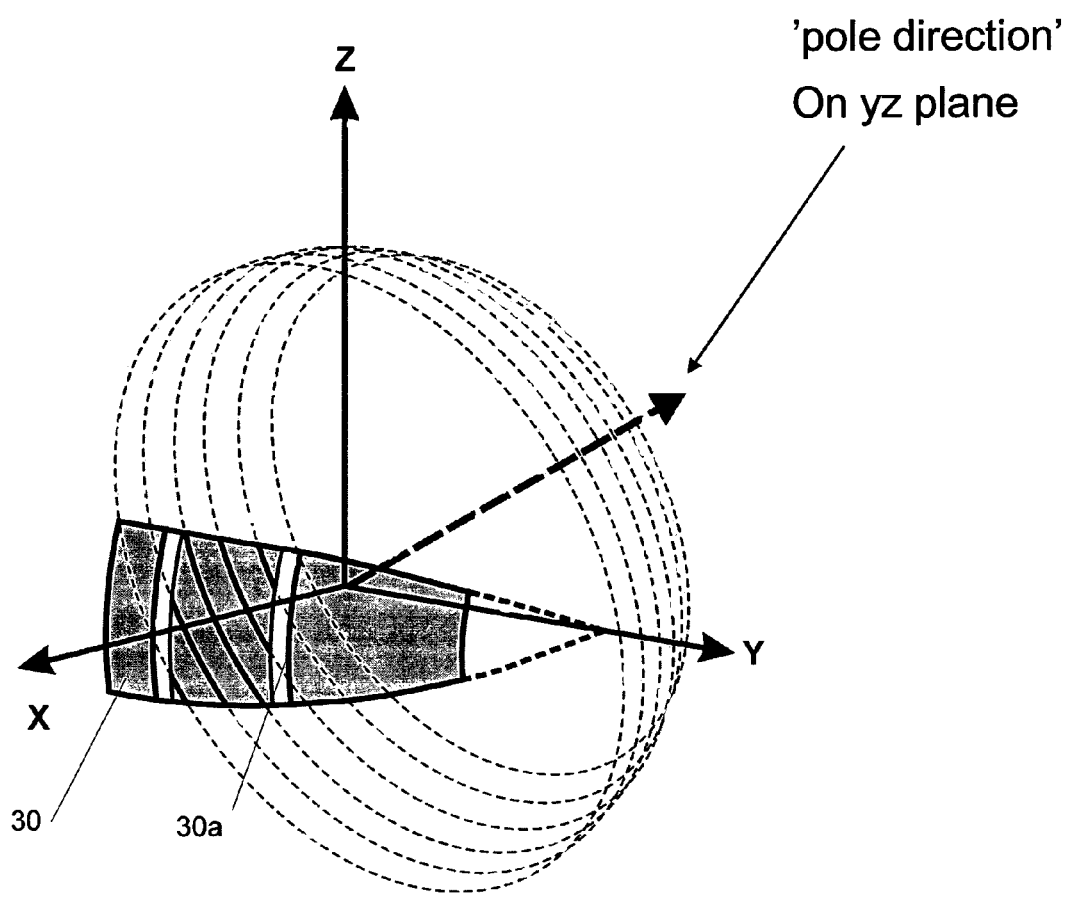
FIG. 5 is schematic representation demonstrating a geometry of an intermediate diffraction grating for using with a non-flat (e.g., spherical shape) substrate and between the in-coupling and out-coupling diffraction gratings shown in FIG. 2 or 3, according to embodiments of the present invention.

FIG. 5 shows a schematic representation demonstrating a geometry of an intermediate diffraction grating 30 for using with a non-flat (e.g., spherical shape) substrate between the in-coupling and out-coupling diffraction gratings shown in FIG. 2 or 3, according to embodiments of the present invention. Possible intermediate gratings for vertical expansion can be selected similarly to the selection of the in-coupling and out-coupling diffraction element, as described herein except that the direction of the pole can be rotated, e.g., in YZ plane as shown in FIG. 5. The grating groove lines 30a are still a series of small circles but they are centered on a new rotated axis. As in a flat-substrate case, the intermediate diffractive element can have an odd number of first order diffractions or an even number of further first order reflections as known in the art and, e.g., described by T. Levola in "Diffractive Optics for Virtual Reality Displays", SID Eurodisplay 05, Edinburg (2005), SID 02 Digest, Paper 22.1. The even number case can correspond to the example shown in FIG. 5. But the EPE with non-flat substrates can be constructed for the odd number of the first order reflections too (similar in principle to the flat-substrate case), but the grooves of the out-coupling diffractive elements then should be rotated by an appropriate angle from being parallel to the grooves of the in-coupling diffractive element similar to the flat-substrate case.

Figure 6:
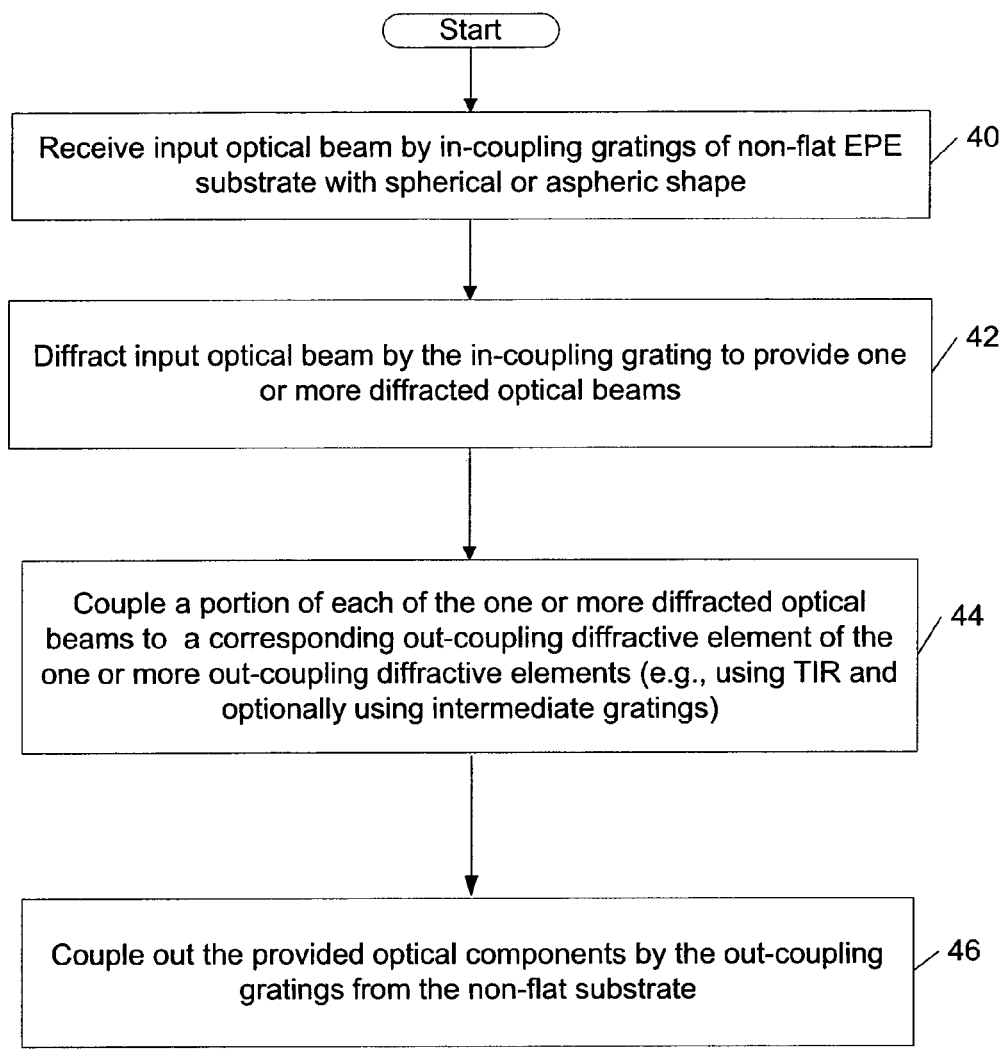
FIG. 6 is a flow chart demonstrating propagation of input optical beam in EPE with a non-flat substrate, according to an embodiment of the present invention.

FIG. 6 shows a flow chart demonstrating propagation of input optical beam in EPE with a non-flat substrate, according to an embodiment of the present invention.

The flow chart of FIG. 6 only represents one possible scenario among others. It is noted that the order of steps shown in FIG. 6 is not absolutely required, so in principle, the various steps can be performed out of order. In a method according to the embodiment of the present invention, in a first step 40, an input optical beam is received by in-coupling diffraction grating of non-flat EPE substrate with the spherical or aspheric shape.

In a next step 42, the input optical beam is diffracted by the in-coupling grating to provide one or more diffracted optical beams within the first and second surface of the non-flat substrate.

In a next step 44, a portion of each of the one or more diffracted optical beams are coupled to a corresponding out-coupling diffractive element of the one or more out-coupling diffractive elements (e.g., using TIR in the non-flat substrate and optionally using intermediate one or more diffractive elements).

In a next step 46, the provided optical components are couples by the out-coupling gratings from the non-flat substrate with the expanded exit pupil compared to the input optical beam.

Figure 7:
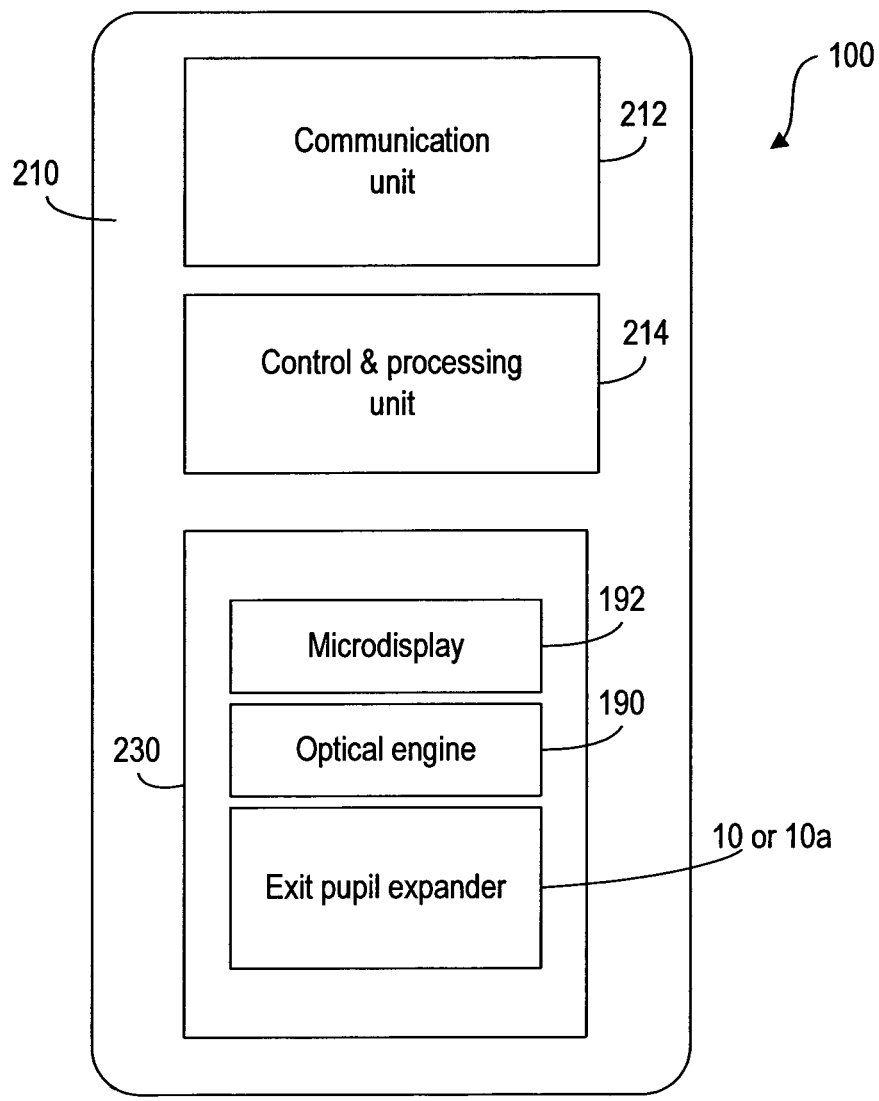
FIG. 7 is a schematic representation of an electronic device, having an exit pupil expander system, according to embodiments of the present invention.

FIG. 7 shows an example of a schematic representation of an electronic device 100, having the non-flat exit pupil expander (EPE) system 10 (or 10a), according to an embodiment of the present invention.

The exit pupil expander (EPE) 10 (or 10a) can be used in an electronic (e.g., portable) device 100, such as a mobile phone, personal digital assistant (PDA), communicator, portable Internet appliance, hand-hand computer, digital video and still camera, wearable computer, computer game device, specialized bring-to-the-eye product for viewing and other portable electronic devices. As shown in FIG. 7, the portable device 100 has a housing 210 to house a communication unit 212 for receiving and transmitting information from and to an external device (not shown). The portable device 100 also has a controlling and processing unit 214 for handling the received and transmitted information, and a virtual display system 230 for viewing. The virtual display system 230 includes a micro-display or an image source 192 and an optical engine 190. The controlling and processing unit 214 is operatively connected to the optical engine 190 to provide image data to the image source 192 to display an image thereon. The EPE 10, according to the present invention, can be optically linked to an optical engine 190.

Furthermore, the image source 192, as depicted in FIG. 7, can be a sequential color LCOS (Liquid Crystal On Silicon) device, an OLED (Organic Light Emitting Diode) array, an MEMS (MicroElectro Mechanical System) device or any other suitable micro-display device operating in transmission, reflection or emission.

Moreover, the electronic device 100 can be a portable device, such as a mobile phone, personal digital assistant (PDA), communicator, portable Internet appliance, hand-held computer, digital video and still camera, wearable computer, computer game device, specialized bring-to-the-eye product for viewing and other portable electronic devices. However, the exit pupil expander, according to an embodiment of the present invention, can also be used in a non-portable device, such as a gaming device, vending machine, band-o-matic, and home appliances, such as an oven, microwave oven and other appliances and other non-portable devices.

It is noted that various embodiments of the present invention recited herein can be used separately, combined or selectively combined for specific applications.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. An apparatus, comprising:
  a non-flat substrate of optical material having a first surface and a second surface which is opposite to the first surface, wherein said first and second surfaces have a spherical or aspheric shape;
  an in-coupling diffractive element disposed on the first or the second surface of the non-flat substrate for receiving an input optical beam;

one or more out-coupling diffractive elements disposed on the first or the second surface of the non-flat substrate;

wherein said in-coupling diffractive element is configured to diffract the input optical beam, so as to provide one or more diffracted optical beams substantially within said first and second surfaces such that a portion of each of said one or more diffracted optical beam is coupled to a corresponding out-coupling diffractive element of said one or more out-coupling diffractive elements;

wherein each of said one or more out-coupling diffractive elements is configured to couple by diffraction parts of said one or more diffracted optical beams from the non-flat substrate for providing one or more output optical beams out of said non-flat substrate;

wherein grooves of the in-coupling diffractive element and of said one or more out-coupling diffractive elements are along parallels of a spherical coordinate system; and wherein a spacing projected on a reference plane between adjacent grooves of the in-coupling diffractive element or of the one or more out-coupling diffraction elements is inversely proportional to sine of an angle between a line crossing a middle point of one of the adjacent grooves of the in-coupling diffractive element or of the one or more out-coupling diffraction elements and an origin of the spherical coordinate system and a line crossing said middle point and a pole of said spherical coordinate system, wherein said reference plane is a focal plane of a spherical or an aspheric inner surface comprising the first or the second surface of the non-flat substrate, whichever is closer to said focal plane.

2. The apparatus of claim 1, wherein said one or more output optical beams have an expanded exit pupil in one or two dimensions relative to the input optical beam.

3. The apparatus of claim 1, wherein said input optical beam is emanated from a virtual image of a display or a microdisplay.

4. The apparatus of claim 1, wherein distances between diffraction grating lines of the in-coupling diffractive element and of the one or more out-coupling diffractive elements are varied according to a predetermined criterion.

5. The apparatus of claim 1, wherein a thickness of said substrate is substantially uniform.

6. The apparatus of claim 1, wherein the input optical beam is generated by an object or a virtual object located in a focal plane of a spherical or an aspheric inner surface comprising the first or the second surface whichever is closer to said focal plane.

7. The apparatus of claim 1, wherein the input optical beam is generated by an object or a virtual object located in a focal plane of a spherical inner surface comprising the first or the second surface whichever is closer to said focal plane and wherein a distance between said spherical inner surface and said focal plane is equal to a radius of said spherical inner surface.

8. The apparatus of claim 6, wherein a central point of the object is imaged substantially without aberrations by said apparatus.

9. The apparatus of claim 1, wherein an object or a virtual object generating said input optical beam is located at a finite distance from said non-flat substrate.

10. The apparatus of claim 1, wherein said in-coupling diffractive element is positioned such that said angle equals ninety degrees for a groove located in said middle point of the in-coupling diffractive element.

11. The apparatus of claim 1, further comprises one or more intermediate diffractive elements disposed-on said non-flat substrate such that at least one or more parts of the input optical beam diffracted in the in-coupling diffractive element are first coupled to said one or more intermediate diffractive elements, which are configured to further couple by diffraction corresponding optical beams to the one or more out-coupling diffractive elements, for providing said one or more output optical beams with an expanded exit pupil in two dimensions relative to the input optical beam.

12. An electronic device, comprising:
a data processing unit;
an optical engine operatively connected to the data processing unit for receiving image data from the data processing unit;
a display device operatively connected to the optical engine for forming an image based on the image data; and an exit pupil expander as claimed in claim 1.

13. The electronic device of claim 12, wherein said one or more output optical beams have an expanded exit pupil in one or two dimensions relative to the input optical beam.

14. A method, comprising:
receiving an input optical beam by an in-coupling diffractive element disposed on a first or a second surface of a non-flat substrate, wherein said first and second surfaces have a spherical or aspheric shape and are opposite to each other;
diffracting the input optical beam to provide one or more diffracted optical beams substantially within said first and second surfaces such that a portion of each of said one or more diffracted optical beam is coupled to a corresponding out-coupling diffractive element of one or more out-coupling diffractive elements disposed on the first or the second surface of the non-flat substrate;
coupling by diffraction parts of said one or more diffracted optical beams from the non-flat substrate using said one or more out-coupling diffractive elements for providing one or more output optical beams out of said non-flat substrate;
wherein grooves of the in-coupling diffractive element and of said one or more out-coupling diffractive elements are along parallels of a spherical coordinate system; and
wherein a spacing projected on a reference plane between adjacent grooves of the in-coupling diffractive element or of the one or more out-coupling diffraction elements is inversely proportional to sine of an angle between a line crossing a middle point of one of the adjacent grooves of the in-coupling diffractive element or of the one or more out-coupling diffraction elements and an origin of the spherical coordinate system and a line crossing said middle point and a pole of said spherical coordinate system, wherein said reference plane is a focal plane of a spherical or an aspheric inner surface comprising the first or the second surface of the non-flat substrate, whichever is closer to said focal plane.

15. The method of claim 14, wherein said one or more output optical beams have an expanded exit pupil in one or two dimensions relative to the input optical beam.

16. The method of claim 14, wherein said input optical beam is emanated from a virtual image of a display or a microdisplay.

17. The method of claim 14, wherein distances between diffraction grating lines of the in-coupling diffractive element and of the one or more out-coupling diffractive elements are varied according to a predetermined criterion.

18. The method of claim 14, wherein a thickness of said substrate is substantially uniform.

19. The method of claim 14, wherein the input optical beam is generated by an object or a virtual object located in a focal plane of a spherical or an aspheric inner surface comprising the first or the second surface whichever is closer to said focal plane.

20. The method of claim 14, wherein the input optical beam is generated by an object or a virtual object located in a focal plane of a spherical inner surface comprising the first or the second surface whichever is closer to said focal plane and wherein a distance between said spherical inner surface and said focal plane is equal to a radius of said spherical inner surface.

21. The method of claim 14, wherein an object or a virtual object generating said input optical beam is located at a finite distance from said non-flat substrate.

* * * * *